US011552964B2

(12) United States Patent
Giladi

(10) Patent No.: US 11,552,964 B2
(45) Date of Patent: *Jan. 10, 2023

(54) DETECTING MAN-IN-THE-MIDDLE ATTACKS IN ADAPTIVE STREAMING

(71) Applicant: Vid Scale, Inc., Wilmington, DE (US)

(72) Inventor: Alexander Giladi, Princeton, NJ (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,179

(22) Filed: Jan. 29, 2020

(65) Prior Publication Data

US 2020/0169573 A1 May 28, 2020

Related U.S. Application Data

(63) Continuation of application No. 15/136,038, filed on Apr. 22, 2016, now Pat. No. 10,587,630.

(Continued)

(51) Int. Cl.
*H04L 9/40* (2022.01)
*H04L 67/02* (2022.01)
(Continued)

(52) U.S. Cl.
CPC ........ *H04L 63/1416* (2013.01); *H04L 63/123* (2013.01); *H04L 63/1466* (2013.01);
(Continued)

(58) Field of Classification Search
CPC ............... H04L 63/1416; H04L 65/608; H04L 63/1466; H04L 63/123; H04L 65/601;
(Continued)

(56) References Cited

U.S. PATENT DOCUMENTS 7,774,499 B1 * 8/2010 Popek ................. H04L 67/2804
709/242
8,087,069 B2 * 12/2011 Bajko ..................... H04L 69/18
726/4
(Continued)

FOREIGN PATENT DOCUMENTS

CN 103999528 A 8/2014
CN 104012049 A 8/2014
(Continued)

OTHER PUBLICATIONS

Dash Industry Forum, "Guidelines for Implementation: DASH-AVC/264 Interoperability Points", Version 2.0, Aug. 15, 2013, 47 pages.
(Continued)

*Primary Examiner* — Cheng-Feng Huang
(74) *Attorney, Agent, or Firm* — Condo Roccia Koptiw LLP

(57) ABSTRACT

Systems and methods for adaptively streaming video content to a wireless transmit/receive unit (WTRU) or wired transmit/receive unit may include obtaining a media presentation description that comprises a content authenticity, requesting a key for a hash-based message authentication code; receiving the key for the hash-based message authentication code, determining a determined hash for a segment of the media presentation description, requesting a reference hash for the segment from a server, receiving the reference hash for the segment from the server, and comparing the reference hash to the determined hash to determine whether the requested hash matches the determined hash.

17 Claims, 10 Drawing Sheets

Related U.S. Application Data

(60) Provisional application No. 62/152,620, filed on Apr. 24, 2015.

(51) Int. Cl.

| | | |
|---|---|---|
| *H04N 21/61* | (2011.01) | |
| *H04N 21/845* | (2011.01) | |
| *H04W 12/10* | (2021.01) | |
| *H04N 21/854* | (2011.01) | |
| *H04N 21/835* | (2011.01) | |
| *H04L 65/65* | (2022.01) | |
| *H04L 65/75* | (2022.01) | |
| *H04W 12/12* | (2021.01) | |
| *H04W 12/73* | (2021.01) | |
| *H04W 12/122* | (2021.01) | |

(52) U.S. Cl.
CPC .............. *H04L 65/65* (2022.05); *H04L 65/75* (2022.05); *H04L 67/02* (2013.01); *H04N 21/6125* (2013.01); *H04N 21/835* (2013.01); *H04N 21/8456* (2013.01); *H04N 21/85406* (2013.01); *H04W 12/10* (2013.01); *H04W 12/12* (2013.01); *H04W 12/122* (2021.01); *H04W 12/73* (2021.01)

(58) Field of Classification Search
CPC ......... H04L 67/02; H04L 65/65; H04L 65/75; H04N 21/6125; H04N 21/8456; H04N 21/85406; H04N 21/835; H04W 12/10; H04W 12/12; H04W 12/00516; H04W 12/1202; H04W 12/73; H04W 12/122
See application file for complete search history.

(56) References Cited

U.S. PATENT DOCUMENTS

| | | | |
|---|---|---|---|
| 8,837,465 B2* | 9/2014 | Lawson | H04L 9/0643 370/352 |
| 9,049,100 B2 | 6/2015 | De Foy et al. | |
| 2002/0044662 A1* | 4/2002 | Sowler | H04L 9/3247 380/277 |
| 2003/0097564 A1 | 5/2003 | Tewari et al. | |
| 2004/0122962 A1* | 6/2004 | DiFalco | H04L 63/104 709/229 |
| 2004/0162787 A1 | 8/2004 | Madison et al. | |
| 2004/0250082 A1* | 12/2004 | Li | H04L 9/3247 713/181 |
| 2005/0273592 A1 | 12/2005 | Pryor et al. | |
| 2008/0140720 A1* | 6/2008 | Six | H04L 51/04 709/219 |
| 2013/0042100 A1 | 2/2013 | Bouazizi et al. | |
| 2013/0124691 A1 | 5/2013 | Suryavanshi | |
| 2013/0144714 A1* | 6/2013 | Yuan | H04N 21/8355 705/14.47 |
| 2013/0290698 A1* | 10/2013 | Giladi | H04L 67/02 713/150 |
| 2013/0291082 A1 | 10/2013 | Giladi et al. | |
| 2013/0291085 A1* | 10/2013 | Chong | H04L 9/3263 726/10 |
| 2013/0297934 A1* | 11/2013 | Suni | H04L 9/321 713/156 |
| 2014/0013103 A1* | 1/2014 | Giladi | H04L 63/0428 713/150 |
| 2014/0019635 A1* | 1/2014 | Reznik | H04L 63/0428 709/231 |
| 2014/0096271 A1* | 4/2014 | Wang | G06F 21/44 726/30 |
| 2014/0101445 A1 | 4/2014 | Giladi | |
| 2014/0115724 A1 | 4/2014 | Van Brandenburg et al. | |
| 2014/0278761 A1* | 9/2014 | Lunt | G06Q 30/0201 705/7.29 |
| 2014/0341026 A1* | 11/2014 | Gahm | H04L 47/38 370/232 |
| 2015/0113604 A1 | 4/2015 | Oyman | |
| 2015/0121484 A1* | 4/2015 | Liu | H04L 63/08 726/5 |
| 2015/0193494 A1 | 7/2015 | Malamal Vadakital et al. | |
| 2015/0215359 A1* | 7/2015 | Bao | H04L 65/60 709/219 |
| 2015/0350205 A1* | 12/2015 | Oyman | H04L 67/02 726/7 |
| 2019/0069297 A1* | 2/2019 | Lee | H04W 74/0833 |
| 2019/0081998 A1 | 3/2019 | Reznik et al. | |

FOREIGN PATENT DOCUMENTS

| | | |
|---|---|---|
| CN | 104488246 A | 4/2015 |
| WO | 2014/069946 A1 | 5/2014 |

OTHER PUBLICATIONS

Giladi, Alex, "MPEG DASH: A Brief Introduction", IEEE COMSOC MMTC E-Letter, vol. 8, No. 2, Mar. 2013, 4 pages.
ISO/IEC, "Information Technology—MPEG Systems Technologies—Part 7: Common Encryption in ISO Base Media File Format Files", ISO/IEC 23001-7:2014, 2nd Edition.
ISO/IEC, "Information Technology—Dynamic Adaptive Streaming over HTTP (DASH)—Part 1: Media Presentation Description and Segment Formats", ISO/IEC 23009-1, 2nd Edition, May 15, 2014, 152 pages.
ISO/IEC, "Information Technology—Dynamic Adaptive Streaming over HTTP (DASH)—Part 3: Implementation Guidelines", ISO/IEC 23009-3, Jan. 25, 2013, 62 pages.
ISO/IEC, "Information Technology—Dynamic Adaptive Streaming over HTTP (DASH)—Part 4: Segment Encryption and Authentication", ISO/IEC 23009-4, Aug. 4, 2012, 34 pages.
ISO/IEC, Information Technology—Coding of Audio-Visual Objects, Part 12: ISO Base Media File Format, ISO/IEC 14496-12, 2005, 94 pages.
ITU-T, "Information Technology—Generic Coding of Moving Pictures and Associated Audio Information: Systems", Recommendation ITU-T H.222.0, Jun. 2012, 228 pages.
Kaufman et al., "Network Security: Private Communication in a Public World", Jan. 1, 2002, 38 pages.

\* cited by examiner

DETECTING MAN-IN-THE-MIDDLE ATTACKS IN ADAPTIVE STREAMING

CROSS-REFERENCE TO RELATED APPLICATIONS

This application is a continuation application of U.S. patent application Ser. No. 15/136,038, filed Apr. 22, 2016, which claims priority to and the benefit of U.S. provisional patent application No. 62/152,620, filed on Apr. 24, 2015, the disclosures of both of which are hereby incorporated herein by reference in there entireties.

BACKGROUND

Where media is transferred over an open or an attack-prone network, either complete content or parts of content that can be used to inject maliciously crafted media files can be protected. ISO/IEC 23009-4 may allow out-of-band validation of segment integrity and authenticity, so that, inter alia, a client may be able to detect a mismatch between a received segment and the segment hash or message authentication code. The server side may be unaware of the attack and/or may not be able to localize the attack.

SUMMARY

Systems and methods for adaptively streaming video content to a wireless transmit/receive unit (WTRU) or wired transmit/receive unit may comprise receiving, at the WTRU, a media presentation description (MPD) file; sending, from the WTRU, a hypertext transfer protocol (HTTP) GET request for a media segment based on the MPD file; receiving, at the WTRU, the media segment from a content server; determining, at the WTRU, a security or authentication hash for the media segment; and sending, from the WTRU, a HTTP request message that comprises the security or authentication hash. The systems and methods may include a WTRU programmed with executable instructions for receiving, at the WTRU, a media presentation description (MPD) file; sending, from the WTRU, a hypertext transfer protocol (HTTP) GET request for a media segment based on the MPD file; receiving, at the WTRU, the media segment from a content server; determining, at the WTRU, a security or authentication hash for the media segment; and sending, from the WTRU, a HTTP request message that comprises the security or authentication hash.

Systems and methods for adaptively streaming video content to a wireless transmit/receive unit (WTRU) or wired transmit/receive unit may comprise requesting a media segment; receiving the media segment; determining a determined hash for the media segment using a key; requesting a reference hash for the media segment; and receiving the reference hash for the media segment. The systems and methods may further include the WTRU including/reporting the determined hash when requesting the reference hash.

Systems and methods for adaptively streaming video content to a wireless transmit/receive unit (WTRU) or wired transmit/receive unit may comprise requesting a media segment; receiving the media segment; determining a determined hash for the segment using a key; requesting a reference hash for the segment; and receiving one of an error message based on the server not having a sufficient number of determined hashes or a message with a majority solution if the server has collected a sufficient number of determined hashes to provide a majority solution.

A method for adaptively streaming video content to a wireless transmit receive unit (WTRU) or wired transmit/receive unit, comprising: receiving at a server a request for a reference hash for a media segment that comprises a determined hash; storing the determined hash; comparing the determined hash to a reference hash to determine whether there is mismatch between the determined hash and the reference hash.

DETAILED DESCRIPTION

Figure 1:
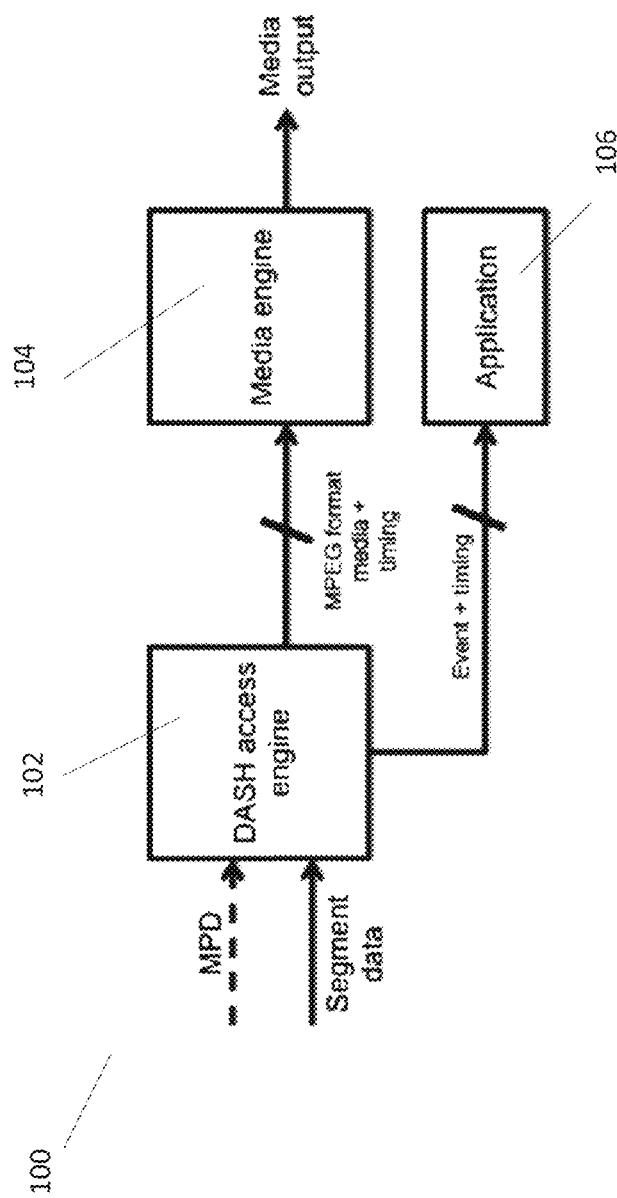
FIG. 1 is a DASH system model.

A detailed description of illustrative embodiments will now be described with reference to the various Figures. Although this description provides a detailed example of possible implementations, it should be noted that the details are intended to be examples and in no way limit the scope of the application.

A method or system that enhances ISO/IEC 23009-4 provides reporting of the segment state, in which case the provider or the operator may detect the attack and localize it. The systems described herein may allow for setting up a verification server (e.g., the interface may be defined in ISO/IEC 23009-4) by a third party and "crowdsourcing" the signatures. The systems may be applicable to Moving Pictures Expert Group Dynamic Adaptive Streaming over HTTP ("MPEG DASH"), SCTE ATS, 3GPP SA4, and ETSI (HbbTV).

Several market trends and technology developments have resulted in the emergence of "over-the-top" (OTT) streaming, which may utilize the Internet as a delivery medium. Hardware capabilities have evolved and there are a wide range of video-capable devices, ranging from mobile devices to Internet set-top boxes (STBs) to network TVs. Network capabilities have evolved and high-quality video delivery over the Internet is viable. As opposed to the traditional "closed" networks, which may be completely controlled by a multi-system operator (MSO), the Internet is a "best effort" environment, where bandwidth and latency may change. Network conditions may be volatile in mobile networks. Dynamic adaptation to network changes may account for volatility and may provide an improved user experience.

Adaptive streaming may be used synonymously with Hypertext Transfer Protocol ("HTTP") streaming. The existing extensive HTTP infrastructure, such as content distribution networks (CDNs), as well as the ubiquity of HTTP support on multiple platforms and devices, may make use of HTTP for Internet video streaming attractive and/or scalable. HTTP streaming may be attractive for video transport protocol, as opposed to a traditional User Datagram Protocol ("UDP") based approach because of firewall penetration. While firewalls may disallow UDP traffic, video over HTTP may be available behind firewalls. HTTP streaming may be the technology of choice for rate-adaptive streaming.

In HTTP adaptive streaming an asset may be segmented, either virtually or physically, and may be published to CDN's. Intelligence may reside in the client. The client may acquire the knowledge of the published alternative encodings (representations) and the way to construct Uniform Resource Locators ("URLs") to download a segment from a given representation. An Adaptive Bit-Rate ("ABR") client may observe network conditions and may decide which combination of bitrate, resolution, etc., will provide the best quality of experience for the client device at an instance of time. The client may determine the URL or an optimal URL to use. The client may issue an HTTP GET request to download a segment.

DASH may be built on top of an HTTP/TCP/IP stack. DASH may define a manifest format, Media Presentation Description (MPD) and may segment formats for ISO Base Media File Format and/or MPEG-2 Transport Streams. DASH may also define a set of quality metrics at network, client operation, and/or media presentation levels. DASH may enable an interoperable way of monitoring Quality of Experience and/or Quality of Service.

A representation may be a DASH concept. Representation may be a single encoded version of a complete asset or of a subset of its components. A representation may be, for example, ISO-BMFF containing unmultiplexed 2.5 Mbps 720p AVC video and may have separate ISO-BMFF representations for 96 Kbps MPEG-4 AAC audio in different languages. There are recommended structures for DASH264. A single transport stream containing video, audio, and/or subtitles may be a single multiplexed representation. A combined structure is possible: video and English audio may be a single multiplexed representation, while Spanish and Chinese audio tracks may be separate unmultiplexed representations.

A segment may be the minimal individually addressable unit of media data and may be the entity that can be downloaded using URLs advertised via the MPD. An example of a media segment is a 4-second part of a live broadcast, which starts at playout time 0:42:38, ends at 0:42:42, and is available within a 3-min time window. Another example is a complete on-demand movie, which is available for the whole period the movie is licensed.

MPD may be an XML document and may advertise the available media. MPD may provide information that is needed by a client in order to select a representation, make adaptation decisions, and/or retrieve segments from a network. MPD may be independent of a segment and may only signal the properties needed to determine whether a representation can be successfully played and its functional properties (e.g., whether segments start at random access points). MPD may use a hierarchical data model to describe a presentation.

Representations may be the lowest conceptual level of the hierarchical data model. At this level, MPD may signal information including, but not limited to, bandwidth and codecs that may be required for successful presentation, as well as ways of constructing URLs for accessing segments. Additional information may be provided at this level, including but not limited to trick mode, random access information, layer and/or view information for scalable and multiview codecs, and/or generic schemes, any of which may be supported by a client wishing to play a given representation.

DASH may provide a rich and/or flexible URL construction functionality. This may allow dynamic construction of URLs, which may be accomplished by combining parts of the URL (e.g., base URL's) that appear at different levels of the hierarchical data model. Multiple base URL's may be used. Segments may have multi-path functionality with segments being requested from more than one location. This may cause improved performance and/or reliability. Single monolithic per-segment URL is also possible in DASH.

If short segments are used, an explicit list of URLs and/or byte ranges may reach several thousand elements per representation. This may be inefficient and/or wasteful where, for example, there is a larger amount of representations. DASH may allow for using predefined variables (e.g., segment number, segment time, etc . . . ) and/or printf-style syntax for on-the-fly construction of URLs using templates. Instead of listing all segments (e.g., seg_00001.ts, seg_00002.ts, . . . , seg_03600.ts, it may be enough to write a single line, (e.g., seg_$Index%05$.ts), to express any number of segments, even if they cannot be retrieved at the time the MPD is fetched. Timing and availability are discussed in more detail below. Due to template efficiency, multi-segment representations may use templates.

Different representations of the same asset (and/or same component, in the unmultiplexed case) may be grouped into adaptation sets. All representations within an adaptation set may render the same content, and a client may switch between them, if it wishes to do so.

An example of an adaptation set would be a collection of ten representations with video encoded in different bitrates and resolutions. It may be possible to switch between each one of these at a segment (or even a subsegment) granularity, while presenting the same or similar content to the viewer. Under some segment-level restrictions, a seamless representation switch may be possible. These restrictions may be used for most practical applications (e.g., they may be used by some DASH profiles, as well as some DASH subsets that may have been adopted by multiple SDO's). These segment restrictions may be applied to representations within an adaptation set. Bitstream switching is discussed herein.

A period may be a time-limited subset of a presentation. Adaptation sets may be valid within the period. Adaptation sets in different periods may or may not contain similar representations (in terms of codecs, bitrates, etc . . . ). An MPD may contain a single period for the whole duration of an asset. Periods may be used for ad markup. Separate periods may be dedicated to parts of the asset itself and/or to each advertisement.

The MPD itself is an XML document that may present a hierarchy that may start from global presentation-level properties (e.g., timing) and may continue with period-level properties, and/or adaptation sets available for that period. Representations may be the lowest level of this hierarchy.

DASH may use a simplified version of XLink and this may allow loading parts of the MPD (e.g., periods) in real time from a remote location. A simple use case for this may be ad insertion, when precise timing of ad breaks is known ahead of time, whereas ad servers may determine the exact ad in real time.

A dynamic MPD can change and may be periodically reloaded by the client, while a static MPD may be valid for the whole presentation. Static MPD's may be a good fit, but are not required, for Video on Demand ("VoD") applications, whereas dynamic MPD's may be, but are not required to be, used for live and personal video recorder ("PVR") applications.

Media segments may be time-bounded parts of a representation and may approximate segment durations that appear in the MPD. Segment duration may not have to be the same for all segments, though in practice segment durations may be close to constant (e.g., DASH-AVC/264 may use segments with durations within a 25% tolerance margin).

In a live broadcast scenario, MPD may contain information regarding media segments that may be unavailable at the time the MPD is read by the client—segments may only be available within a well-defined availability time window, which may be calculated from the wall-clock time and/or segment duration.

Another segment type is the index segment. Index segments may appear as side files, or within the media segments, and may contain timing and/or random access information. Indexes may make efficient implementation of random access and/or trick modes. Indexes may be used for more efficient bitstream switching. Indexes may be used for VoD and/or PVR type applications.

Segment-level and/or representation-level properties may be used to implement bitstream switching. DASH may provide explicit functional requirements for these, which may be expressed in the MPD in a format-independent way. Each segment format specification may contain format-level restrictions that may correspond to these requirements.

Media segment i of representation R as $S_R(i)$ may have a duration denoted as $D(S_R(i))$. The earliest presentation time may be $EPT(S_R(i))$. Earliest Presentation Time ("EPT") may correspond to the earliest presentation time of the segment, rather than the time at which a segment can be successfully played out at random access.

Time alignment of segments for all representations within an adaptation set may be useful for switching and doing so efficiently. Time alignment may use, for any pair of representation $R_a$ and $R_b$, a segment i, $EPT(S_{R_a}(i)) < EPT(S_{R_b}(i-1)) + D(S_{R_b}(i-1))$. Time alignment and the requirement that a segment starts with a random access point of certain types may ensure the ability to switch at a segment border without overlapped downloads and/or dual decoding.

When indexing is used, bitstream switching at a subsegment level may be used. Similar requirements may be used for subsegments.

Systems may use time alignment and/or random access point placement restrictions. In terms of video encoding, these restrictions may translate into encodings with matching Instantaneous Decoder Refresh ("IDR") frames at segment borders and/or closed Group of Pictures ("GOP's").

A DASH client 100 may conceptually include an access client 102, which may be an HTTP client, a media engine 104, which may decode and may present media provided to it, and an application 106, to which the access client may pass events. Interfaces may use on-the-wire formats of the MPD and segments. FIG. 1 is a DASH system model.

In Apple HTTP Live Streaming ("HLS") all segments mentioned in a manifest may be valid, and a client may poll for new manifests. DASH MPD may reduce polling behavior. DASH MPD may define MPD update frequency and/or may allow calculation of segment availability.

A static MPD may be valid. A dynamic MPD may be valid from the time it was fetched by the client for a stated refresh period. An MPD may also have a notion of versioning and may expose its publication time.

MPD may provide the availability time of the earliest segment of a period, TA(0). Media segment n may be available starting from time $$T_A(n) = T_A(0) + \sum_{i=0}^{n-1} D(S_R(i)),$$

and may be available for the duration of the timeshift buffer $T_t s$, as may be stated in the MPD. Availability of the window size may have an impact on the catch-up TV functionality of a DASH deployment. Segment availability time may be relied upon by the access client as long as it falls within the MPD validity period.

For any representation R MPD may declare bandwidth $B_R$. MPD may also provide a global minimum buffering time, $BT_{min}$. An access client may be able to pass a segment to the media engine after $B_R \times BT_{min}$ bits were downloaded. A given segment may start with a random access point. The earliest time that segment n can be passed to the media engine is $T_A(n) + T_d(n) + BT_{min}$, where $T_d(n)$ stands for the download time of segment n. In order to minimize the delay, a DASH client may want to start the playout immediately, however MPD may propose a presentation delay (as an offset from $T_A(n)$) in order to ensure synchronization between different clients). Tight synchronization of segment HTTP GET requests may create a thundering herd effect, which may tax the infrastructure.

MPD validity and segment availability may be calculated using absolute (i.e., wall-clock) time. Media time may be expressed within the segments themselves, and in the live case, drift may develop between the encoder and/or client clocks. This may be addressed at the container level, where both MPEG-2 TS and ISO-BMFF standards may provide synchronization functionality.

Events may be an extension to DASH. HTTP may be stateless and/or client-driven. "Push"-style events may be emulated using frequent polls. In ad insertion practice in cable/internet protocol television (IPTV) systems, upcoming ad breaks may be signaled 3-8 sec. before their start. A straightforward poll-based implementation can be inefficient, and events have been designed to address use cases.

Events may be "blobs" with explicit time and/or duration information and/or application-specific payloads. Inband events may be small message boxes appearing at the beginning of media segments, while MPD events may be a period-level list of timed elements. DASH defines an MPD validity expiration event, which may identify the earliest MPD version that is valid after a given presentation time.

DASH is agnostic to digital rights management (DRM). DASH supports a signaling DRM scheme and its properties within the MPD. A DRM scheme may be signaled via the ContentProtection descriptor. An opaque value may be passed within it. In order to signal a DRM scheme, a unique identifier for a given scheme may be used and may define the meaning of the opaque value (or use a scheme-specific namespace instead).

MPEG developed two content protection standards, Common Encryption for ISO-BMFF (CENC) and Segment Encryption and Authentication. Common encryption standardizes which parts of a sample are encrypted, and how encryption metadata is signaled within a track. The DRM module may be responsible for delivering the keys to the client, given the encryption metadata in the segment, while decryption itself may use standard AES-CTR or AES-CBC modes. The CENC framework may be extensible and may use other encryption algorithms beyond these two, if defined. Common Encryption may be used with several commercial DRM systems and may be used in DASH264.

DASH Segment Encryption and Authentication (DASH-SEA) is agnostic to the segment format. Encryption metadata is passed via the MPD, as opposed to some inband mechanism. For example, MPD may contain information on which key is used for decryption of a given segment and how to obtain this key. The baseline system may be equivalent to the one defined in HLS, with AES-CBC encryption and/or HTTPS-based key transport. MPEG-2 TS media segments may be compatible with encrypted HLS segments. The standard itself may allow for other encryption algorithms and more DRM systems, similarly to CENC.

DASH-SEA may also offer a segment authenticity framework. This framework may ensure that the segment received by the client is the same as the one the MPD author intended the client to receive. This may be done using MAC or digest algorithms, and the intent may be to prevent content modification within the network (e.g., ad replacement, altering inband events, etc.).

Man-In-the-Middle Attacks may involve media segments that may be sent over insecure links (e.g., HTTP and not HTTPS) for, inter alia, performance reasons. An entity in the network can modify the content of the HTTP response. For broadcast delivery over the air a fake transmitter may be used to produce modified content. For purely audiovisual material, this man-in-the-middle attack is dangerous due to, inter alia, either exploitation of known weaknesses of common equipment to maliciously crafted parameters, and/or due to replacement of provider-inserted advertising. For content requiring receiver action (e.g., issuing HTTP GET, parsing documents, executing scripts), the danger involved may include a TV being a full-fledged computer and it may be tricked into running malicious JavaScript scripts, or a session may be completely hijacked (MPD or TEMI). DRM may not help to mitigate the situation—except for full-segment encryption practiced by Apple HLS, the rest of the methods may protect the media content from unauthorized viewing and may not provide protection from modification of the media.

ISO/IEC 23009-4 (DASH Part 4) may provide a framework for out-of-band segment integrity verification. This may solve the problem for a part of the use cases (e.g., a complete segment may be protected, and an attacker may be unable to modify a segment including events). Use of HTTPS is another solution, where TLS guarantees authenticity and integrity throughout the session.

The current ISO/IEC 23009-4 solution may work when some trusted entity has set up an authoritative server. If no such entity has expended the effort to set up such a server, the integrity may not be verified (e.g., using ISO/IEC 23009-4 techniques). The ISO/IEC 23009-4 solution also may not allow for attack reporting and isolation (e.g., detecting where in the network the attack occurs)—that is, only the client may know that verification failed, and even the client may not know the origin of the attack.

The HTTPS solution may not have the "trusted entity" problem. The same server serving media segments may be the trusted entity. Reporting and isolation may not be built into this solution. Moreover, HTTPS may not scale as well as HTTP.

The systems and methods described herein may modify ISO/IEC 23009-4 to carry the hash/MAC value. The hash/MAC may be calculated by the client and may be included in the client request for a reference value of the hash/MAC.

The systems and methods described herein may use hashes/MACs for the purpose of attack detection, reporting, and isolating, and provide an extension of ISO/IEC 23009-4 to accommodate for using hashes/MACs for the purpose of attack detection, reporting, and isolating, and/or provide additional systems and methods of identifying the attack location within the network topology. The systems described herein may be relevant for use of segmented download, not necessarily over HTTP and not limited to DASH. The discussion below assumes MPEG DASH and ISO/IEC 23009-4 (DASH-SEA, Segment Encryption and Authentication). DASH Client operation may include one or more of the following in any permissible combination or order.

A DASH client may obtain an MPD, which may contain a ContentAuthenticity XML element (as may be defined in 23009-4). An extension of the DescriptorType element (e.g., in 23009-1) or ContentAuthenticity element (e.g., in 23009-4) to include XLink attributes (e.g., @xlink:href) may allow receiving the authenticity setup information from a source different from the one that generates the MPD. Such an extension may be used.

A DASH client may derive a keyed-hash message authentication code ("HMAC") (e.g., if HMAC is to be used). HMAC is a specific construction for calculating a message authentication code (MAC) involving a cryptographic hash function in combination with a secret cryptographic key. The key may be the response to an HTTP GET request to a URL constructed from ContentAuthenticity@keyUrlTemplate attribute. GMAC is an alternative message authentication technique which may be used. While GMAC is not supported in current DASH-SEA, adding support to it may include an additional step of initialization vector (IV) derivation. Addition of GMAC may include adding attributes to the ContentAuthenticity element. The mechanism may be identical to the one currently provided for AES-GCM encryption in ISO/IEC 23009-4. The mechanism may be simplified to reduce the overhead of key and/or initialization vector traffic. A key may be requested once per period and may derive initialization vectors at the client side. Section 6.4.4 of ISO/IEC 23009-4 discusses the initialization vector process for an encryption case. Such derivation may use the same mechanism as authenticated encryption in the ISO/IEC 23009-4 specification, namely, enough information may be signaled in the MPD (within the same descriptor) to make correct IV derivation possible. IV derivation process for GMAC would be similar to the one performed for AES encryption in GCM mode. The process is described in section 6.4.4. of ISO/IEC 23009-4. This may be achieved by adding one or more attributes or elements to the ContentAuthenticity element or/and by using other XML elements defined in ISO/IEC 23009-4 in the same descriptor as ContentAuthenticity elements.

A DASH client may download a segment. For outbound parameter encryption, signing request URLs initialization vector derivation may occur at this stage. IV derivation may also occur at this stage if GMAC is used.

A DASH client may compute a hash or a MAC for the segment (e.g., a client-computed value of the hash or MAC). The algorithm and the key may be derived from the ContentAuthenticity element.

A DASH client may request a hash or a MAC of the segment from the server, given the URL derived from ContentAuthenticity@authUrlTemplate attribute. This proposal may augment the URL derivation in one or more of the following ways (e.g., which may be independent of each other). The client may embed the result of the computation (e.g., the client-computed value of the hash or MAC for a given segment) into the request. This may be done by embedding it directly into the URL (e.g., as a URL query parameter) or by creating a new HTTP header to carry the computation result. The client may embed one or more diagnostic parameters into the request. These parameters may include one or more of an IP address of the server that provided the segment, a set of GPS coordinates, a cell tower identifier, a wireless access point identifier such as SSID, additional properties or details about the cell tower and/or wireless access point (e.g., network provider, signal strength), etc. . . . The diagnostic parameters may be embedded into the URL (e.g., using query parameters) or may be placed in one or more HTTP headers. If the request is made using HTTP (and not HTTPS), then the parameters may be encrypted and the data which carries the parameters (e.g., the complete URL if parameters are embedded in the URL; or the HTTP headers if such headers are used to carry the parameters) may be signed. This can be accommodated by providing an extra key for "uplink" encryption (or using same key as provided for HMAC/GMAC computation). Time and/or a form of client identification (e.g., IP address) may be included into the encrypted and signed parameter data (e.g., the signed URL or signed header data). This may avoid man-in-the-middle and/or replay attacks against this mechanism. Derivation of the extra key and associated Initialization Vector (IV) may be done as in or similar to the ISO/IEC 23009-4 CryptoPeriod element and may be implemented by adding attributes/elements, described in ISO/IEC 23009-4, to the ContentAuthenticity element. The key and IV derivation may happen as described in Section 6.4.4 of ISO/IEC 23009-4.

A DASH client may receive the requested hash/MAC from the server and may compare it with its own client-computed hash or MAC result, for example, as described herein. In case of failure (e.g., the client-computed value does not match the value provided by the server), then the client may discard the segment.

Server operation may be as follows and may include one or more of the following in any permissible combination. The server may receive the request (referenced in the client operation) and may respond with a hash or MAC from its database (23009-4 operation).

The server may compare the client-computed hash/MAC with the one it has in the database. If there is a mismatch, the server may report the mismatch to the provider (e.g., a content provider, such as a content owner, a content distributor, a broadcaster, an over-the-top video service, an ad provider, and/or the like). For the attack localization purposes, it may use the parameters specified in the client request (the client-computed hash or MAC and/or the diagnostic parameters—see client operation) as well as a client identity or user identity derived from a client IP address (e.g., geolocation or/and tying IP with an identity via 3rd party databases). Client parameters may be collected from multiple requests, which may be received from multiple different clients. This may allow the operator to localize the attack, e.g., to a certain CDN, provider, access point(s), etc. Attack localization capability may depend on the information known to the server from the client requests (e.g., without active user participation). Information may be requested for the client IP address, client identity or user identity from external services operated possibly by different entity (such as GeoIP provider). Relatively precise information on the client location and its ISP may be known. Geographic location, low-level network information (e.g., signal strength, cell tower, and/or wireless network SSID) can help identify a last hop attack. Aggregation of results combined with knowledge of network topology (possibly requested from different sources, either in real time or offline) may allow localization of an attack happening deeper in the network. For example, it can be checked from which CDN and specific CDN nodes the modified segments arrived. The CDN provider may be able to trace the route of the modified segment en route from its edge node to the network operator, while the network operator may be able to trace the request route through its system. Knowledge of device type and player details (e.g., player/version/OS) may be used to localize the attack to a specific class of clients. Such information may be provided to the server in any request messages sent from the client to the server (e.g., in a 'user agent' field or a similar information field).

Methods and systems described herein may be applicable to a crowdsourcing mode. A possible use case is where a provider (e.g., a content provider, such as a content owner, a content distributor, a broadcaster, an over-the-top video service, an ad provider, and/or the like) opts not to set up an authoritative 23009-4 server on its behalf, but the DASH client has knowledge of a 23009-4 server run by a separate entity. The knowledge may not come from the provider-supplied MPD; the information may come from a different source. In this case a server may receive the hash/MAC (e.g., a hash or MAC corresponding to a content segment) from the client (e.g., from multiple clients which received the same segment) and the server may store the received hash or MAC values. When the server receives a request for the hash or MAC of a content segment from a client, the server may determine that it has not received enough client-computed hash or MAC values for that segment in order to produce an authoritative hash or MAC value for the response. In this case, the server may respond with an error response notifying the client that a hash is unavailable. After a certain threshold is crossed (e.g., when a statistically significant amount of requests were made for the same segment, and/or a statistically significant number of matching hash or MAC values have been received from clients for that segment), the server may start responding with the hash/MAC version it considers authoritative. An alternative implementation may respond with the current majority solution (e.g., the most common hash/MAC value received from clients for the segment) from the start, instead of sending the error response, but in this case the server may add information to express a confidence level for the provided majority solution. For example, the server may indicate in the response the number of received values which matched the majority solution, the number of received values which did not match the majority solution, and/or the total number of values received, all expressed for the current segment. For example, the server may indicate in the response that 5 out of 5 received samples had the majority solution value, or that 998 out of 1000 received samples had the majority solution value, or that 576 received samples had the majority solution value while 12 received samples did not, etc. . . . This may be implemented by adding a custom HTTP header to represent the values which express the confidence level. For example, the HTTP response may include for example the line "x-dash-sea-auth-support: 998/1000" to indicate that 998 of 1000 received samples had the majority solution which the server provided to the client in the response.

Changes to ISO/IEC 23009-4 may include a template (substitution) variable (e.g., $sign$) that may be defined and may carry a hash/MAC from the DASH client to the server. Existing DASH template construction mechanisms may be used for constructing the request. Additional template variables may be defined for the diagnostic parameters (e.g., $GPS$, $CellID$, $SSID$, $SegmentServerIP$, or similarly for any of the diagnostic parameters described herein). The template variables may be visible by inspection of the MPD as these variables may be included in ContentAuthenticity@authUrlTemplate.

Figure 2:
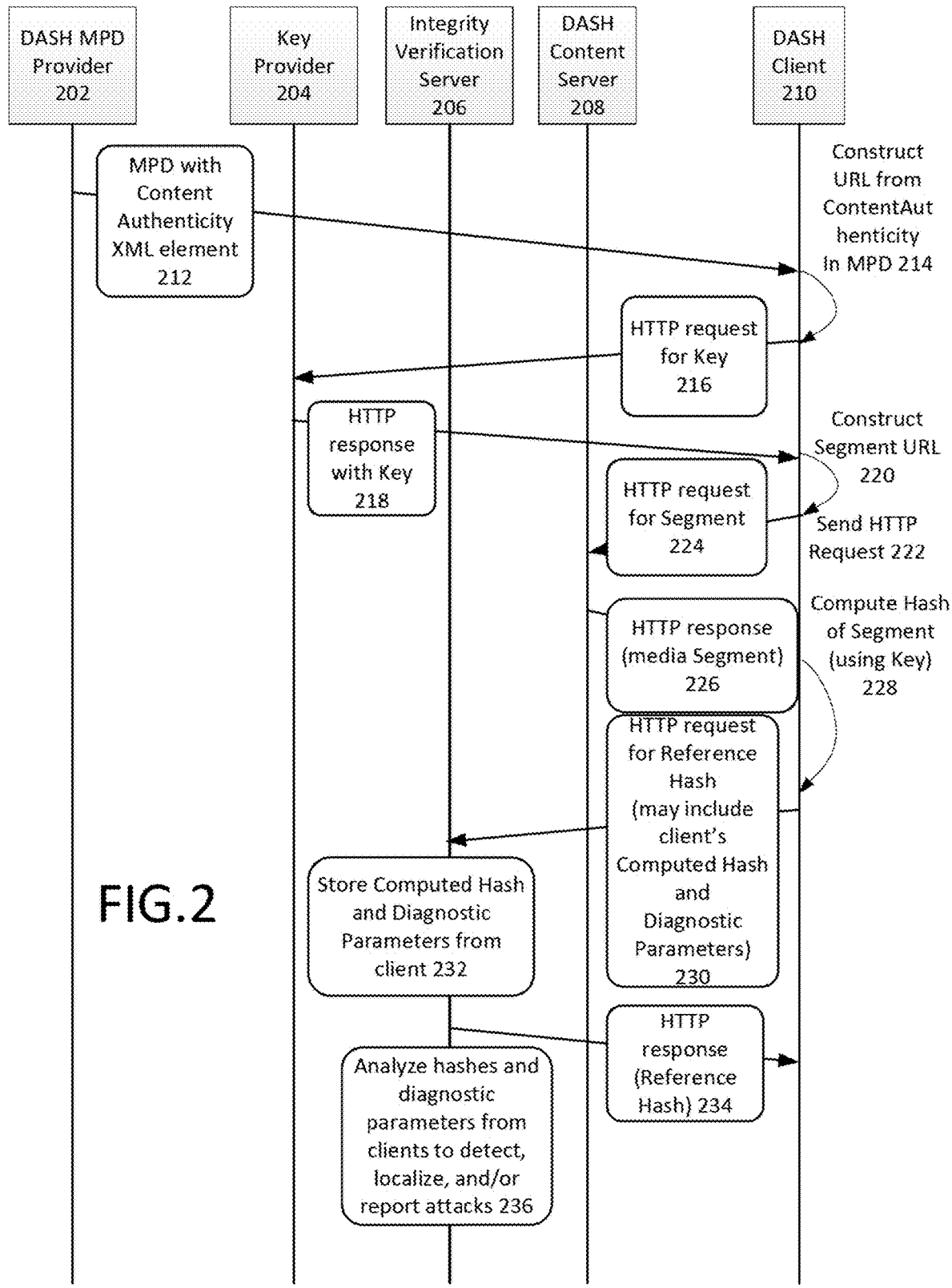
FIG. 2 is an example system and method according to one or more embodiments described herein.

FIG. 2 shows an example system. FIG. 2 shows client reporting of hashes and diagnostic parameters, and the server response to the reporting of these values. As shown in FIG. 2, there is a DASH MPD Provider 202, a key provider 204, an integrity verification server 206, a DASH content server 208, and a DASH client 210. Note that while the various providers and servers may exist as separate entities (as shown in the figure), they may also be combined in various ways, for example the key provider 204 and the integrity verification server 206 may reside in a single server, or the integrity verification server 206 and the DASH content server may be likewise combined. The DASH MPD Provider 202 may provide MPD with content authenticity XML element 212 to the DASH Client 210. The DASH Client 210 may construct a URL from the content authenticity in MPD at 214. The DASH Client 210 may send an HTTP request for a key at 216 to the Key Provider 204. The Key Provider 204 may send an HTTP response with the Key at 218 to the DASH Client 210. The request for and receipt of the key in steps 216 and 218 may occur at any time before the DASH Client requests or reports a segment HASH or MAC value. (As an illustration, steps 216 and 218 might alternately be performed after steps 224 and 226 but before step 230). The DASH Client 210 may construct the segment URL at 220. At 222, the DASH Client may send an HTTP request for the Segment at 224 to the DASH Content Server 208. The DASH Content Server 208 may send an HTTP Response at 226 to the DASH Client 210. The HTTP Response may include a segment, such as a media segment. At 228, the DASH Client 210 may compute the HASH or MAC of the segment using the Key. The DASH Client 210 may send at 230 an HTTP request for a reference HASH or MAC, which may include the client computed hash or MAC and/or diagnostic parameters, to the Integrity Verification Server 206. The Integrity Verification Server 206 may at 232 store the computed HASH or MAC and/or the diagnostic parameters received from the DASH Client 210. At 234, the Integrity Verification Server 206 may send an HTTP response, which may include a reference hash or MAC for the segment, to the DASH Client 210. For example, the reference hash or MAC may have been provided to the integrity verification server by a content provider, such as a content owner, a content distributor, a broadcaster, an over-the-top video service, an ad provider, and/or the like. As another example, the reference hash or MAC may have been determined by the integrity verification server based on collecting client-computed hash or MAC values for the same segment from multiple clients and determining a majority solution (e.g., the hash or MAC value seen most commonly in the received client-computed hash or MAC values, observed over many samples). The Integrity Verification Server 206 may at 236 analyze the hashes and/or diagnostic parameters from the DASH Client 210 to detect, localize, and/or report attacks. For example, the integrity verification server may detect an attack by comparing the received client computed hash or MAC values to a reference hash value, and determining a mismatch in one or more of the received client computed hash values. A detected attack may be localized by analyzing the diagnostic parameters provided by the clients which provided the non-matching hash or MAC values, and/or by querying CDN providers, network providers, or other outside information sources as previously described herein. Information about a detected attack and/or its localization information may be reported to a content provider, e.g., to a provider which provides or distributes the content segments which may have been compromised in the attack.

Figure 3:
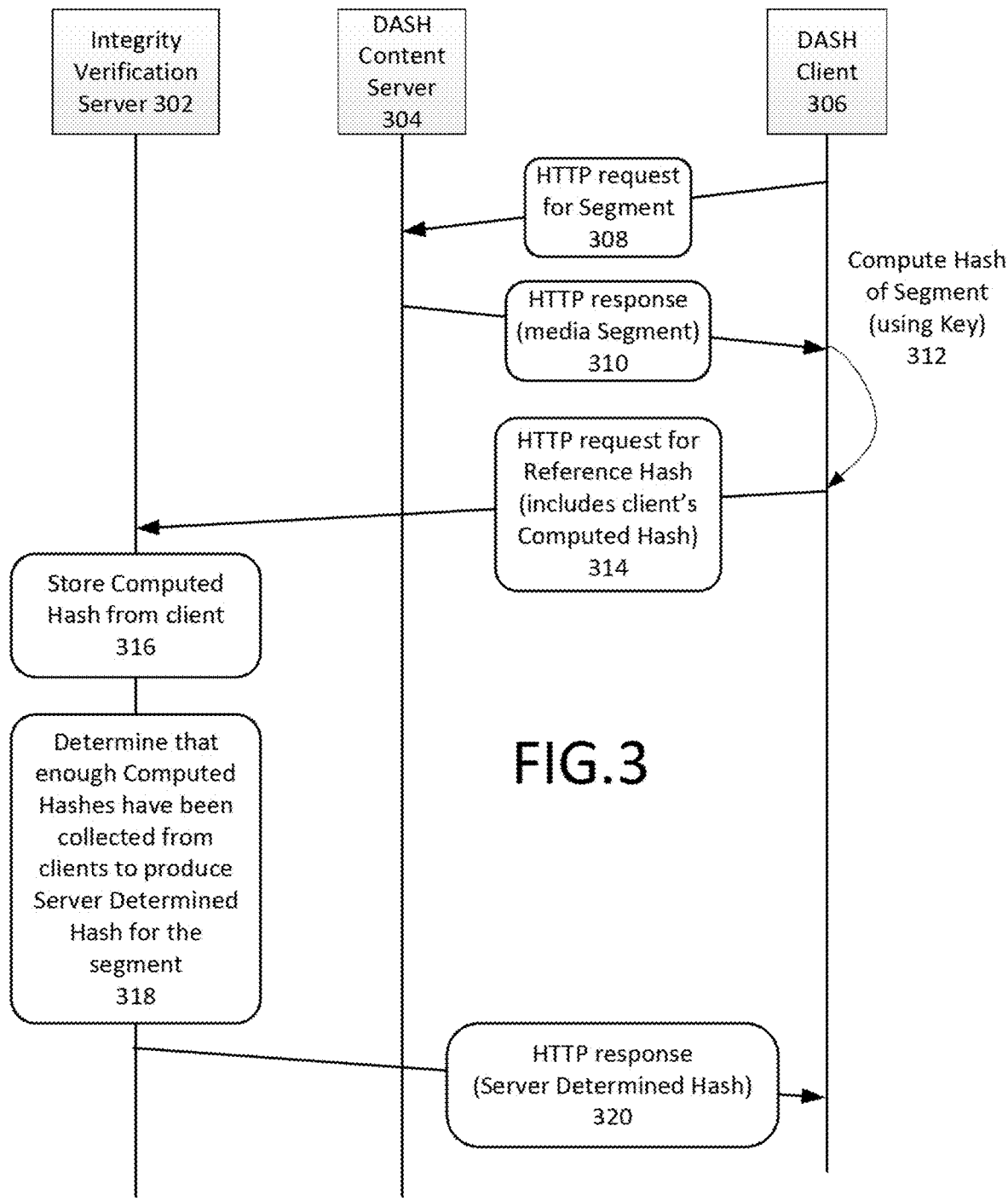
FIG. 3 is an example system and method according to one or more embodiments described herein.

FIG. 3 shows an example system. FIG. 3 as well as FIGS. 4 and 5 described below do not explicitly show the leading steps of MPD distribution and generating/obtaining the HMAC key. However, it will be appreciated that those steps, as generally shown in FIG. 2 may be used with the systems and methods shown in FIGS. 3-5. For example, steps 212, 216, and/or 218 may be performed as initialization steps for any of the systems and methods shown in FIGS. 3-5. FIG. 3 may be applicable to a crowdsourced case, where a client may provide the client computed hashes and the central provider has not necessarily provided any reference hashes for use by the integrity verification server. FIG. 3 illustrates operations and algorithms of the integrity verification server 302 once the server determines that enough client computed hashes have been collected (for the current segment) in order for the server to produce a "Server Determined Hash" (e.g., the hash/MAC version which the server considers to be authoritative) based on the collected client-computed hashes. This decision may be made on a segment-by-segment basis. In this regard, the integrity verification server may track the status (e.g., what client-computed hash data is already received and stored, how many received hashes match the current majority solution, etc . . . ) on a per segment basis. FIG. 3 shows an Integrity Verification Server 302, a DASH Content Server 304, and a Dash Client 306. The Dash Client 306 may send an HTTP request for a segment at 308 to the DASH Content Server 304. The DASH Content Server 304 may send an HTTP response including a segment (which may be a media segment) at 310 to the DASH client 306. At 312, the Dash Client 306 may compute a HASH or MAC for the segment using a key (e.g., the key may first be obtained by the Dash Client 306 using the procedure of steps 216 and 218 of FIG. 2, or by another key exchange or key derivation mechanism). The Dash Client 306 may send to the Integrity Verification Server 302 an HTTP request for a reference HASH or MAC, which may include the client computed HASH or MAC, at 314. The Integrity Verification Server 302 may store the computed HASH or MAC received from the DASH Client 306 at 316. At 318, the Integrity Verification Server 302 may determine whether enough computed HASH or MAC values for the segment have been collected from the clients to produce a server determined HASH or MAC for the segment. The Integrity Verification Server may at 320 send an HTTP response with the server determined HASH or MAC to the DASH Client if the Integrity Verification Server 302 has computed a server determined HASH or MAC for the segment.

Figure 4:
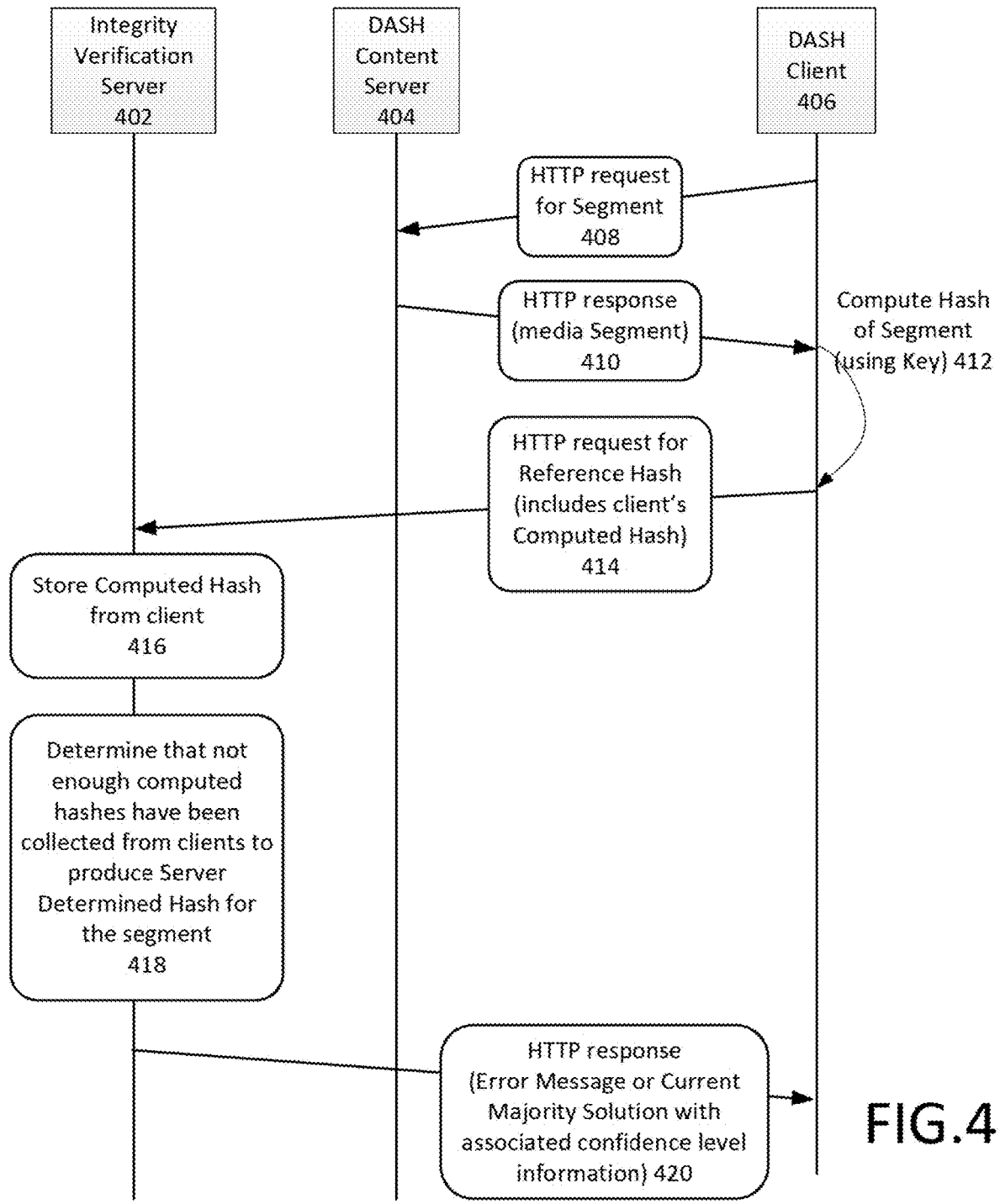
FIG. 4 is an example system and method according to one or more embodiments described herein.

FIG. 4 shows an exemplary system. FIG. 4 may apply to a crowdsourced case. FIG. 4 shows, inter alia, how the integrity verification server may behave early in the process, e.g., when the server determines that there are not enough client-computed hash or MAC values that have been collected for the current segment in order to produce a server determined hash or MAC for the segment. In this case, the server may echo the client-computed hash received from the current client. Alternately the server may respond with the current majority solution (e.g., the most common hash or MAC value received from clients for the segment), and may indicate confidence information associated with the current majority solution, as described herein. As yet another alternative, the server may respond with an error message to indicate to the requesting DASH client that no authoritative or server-determined hash or MAC is available. The system and method of FIG. 4 may include or use an Integrity Verification Server 402, a DASH Content Server 404, and a DASH Client 406. The DASH Client may send an HTTP request for a segment at 408 to the DASH Content Server 404. The DASH Content Server 404 may send an HTTP Response with a segment (e.g., a media segment) to the DASH Client 406 at 410. The DASH Client 406 may compute the HASH for a segment at 412 using a key (e.g., the key may first be obtained by the Dash Client 306 using the procedure of steps 216 and 218 of FIG. 2, or by another key exchange or key derivation mechanism). At 414, the Dash Client 406 may send to the Integrity Verification Server 402 an HTTP Request for a reference HASH or MAC which may include the DASH Client's computed HASH or MAC. The Integrity Verification Server 402 may store the computed HASH or MAC from the client at 416. At 418, the Integrity Verification Server 402 may determine whether enough computed HASH or MAC values for the segment have been collected from the clients to produce a server determined HASH for the segment. The Integrity Verification Server 402 may send to the DASH Client 406 an HTTP response, which may include an Error Message or the Current Majority Solution with associated confidence level information at 420.

Figure 5:
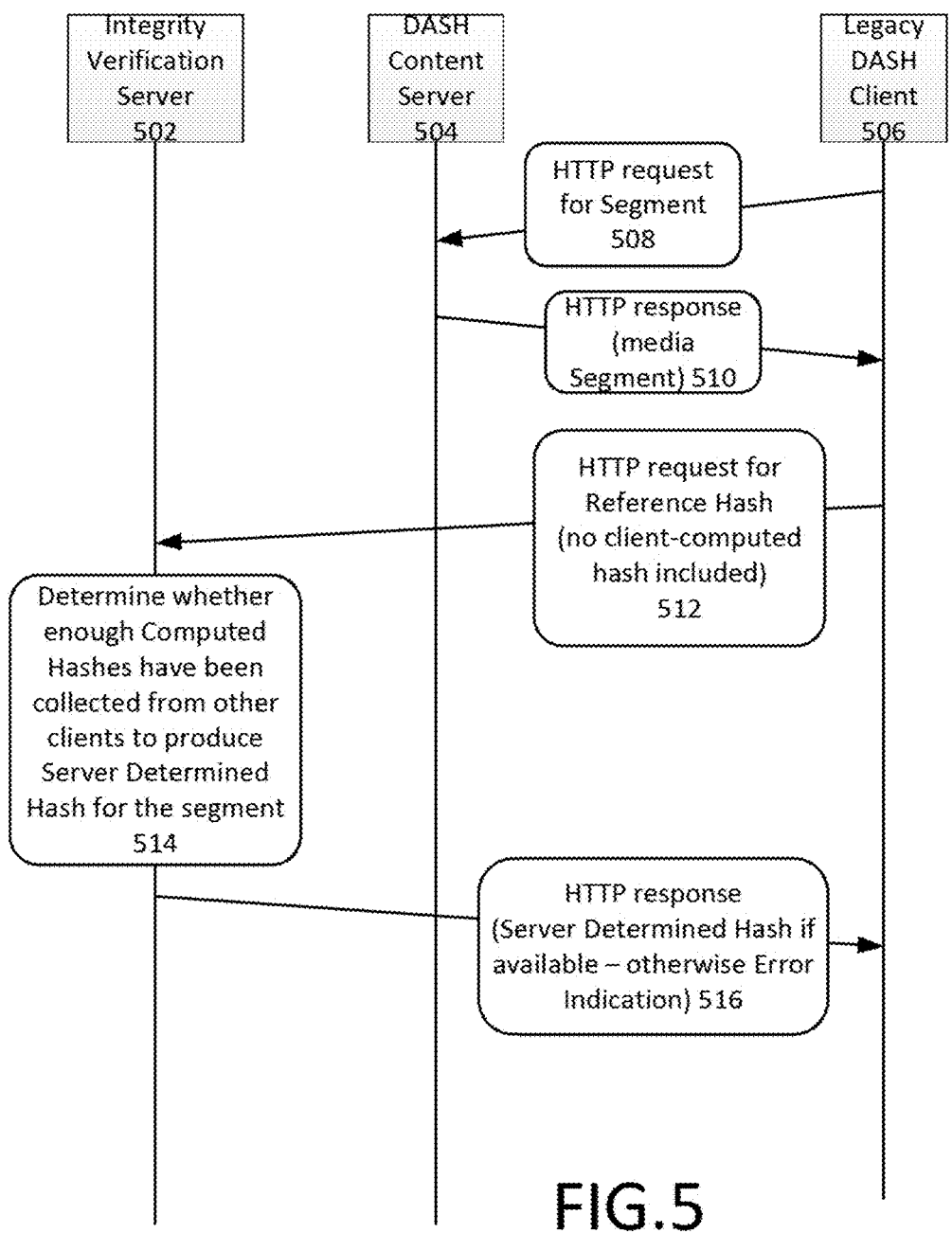
FIG. 5 is an example system and method according to one or more embodiments described herein.

FIG. 5 shows an exemplary system. FIG. 5 may be used for a crowdsourced case. FIG. 5 shows, inter alia, the consideration of a request from a legacy DASH client which may not have a capability to report a client-computed hash or MAC to the integrity verification server. The Integrity Verification Server may report its server-determined hash (if it has collected enough client-computed hashes previously for the segment), or it may report an appropriate error message if no such server-determined hash is available. The system and method of FIG. 5 may include or use an Integrity Verification Server 502, a DASH Content Server 504, and a legacy DASH Client 506. The legacy DASH Client 506 may send an HTTP request for a segment at 508 to the DASH Content Server 504. The DASH Content Server 504 may send an HTTP Response (media segment) to the legacy DASH Client 506 at 510. The legacy DASH Client 506 may send to the Integrity Verification Server 502 an HTTP Request for a reference HASH or MAC at 512, which may not include a DASH Client's computed HASH or MAC. (Although not shown in the figure, the legacy DASH Client 506 may generate or obtain an appropriate key before communicating with the Integrity Verification Server 502, for example steps 216 and 218 of FIG. 2 or a similar procedure may be performed before the Reference Hash is requested in step 512). At 514, the Integrity Verification Server 502 may determine whether enough computed HASH or MAC values for the segment have been collected from other DASH clients (e.g., non-legacy clients) to produce a server determined HASH or MAC for the segment. At 516 the Integrity Verification Server 502 may send to the Legacy DASH Client 506 an HTTP response, which may include a server determined HASH for the segment if one is available, otherwise the Integrity Verification Server 502 may send an error message to the legacy DASH client 506. The error message may indicate that no reference hash or MAC value is available for the segment.

Figure 6A:
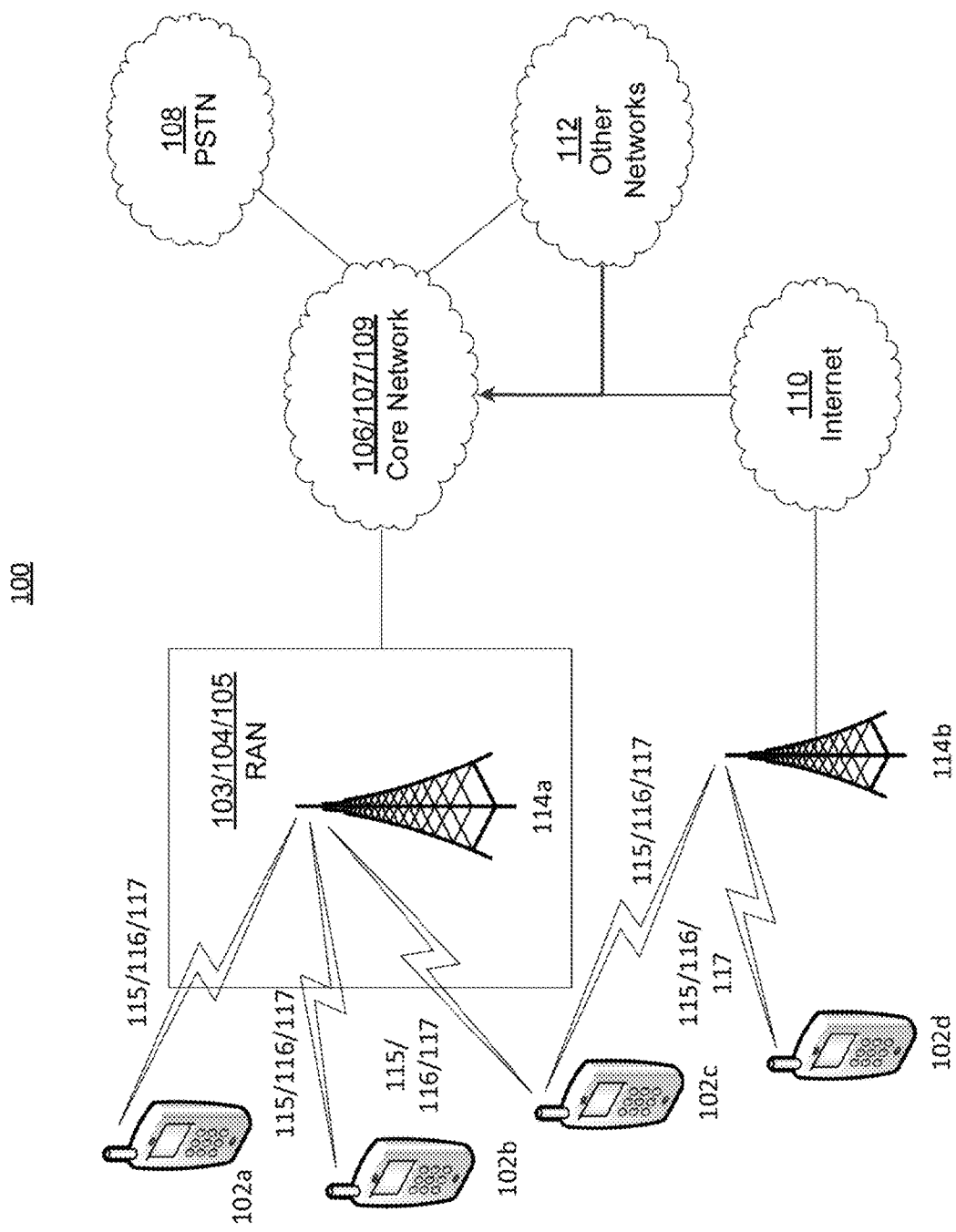
FIG. 6A is a system diagram of an example communications system in which one or more disclosed embodiments may be implemented.

FIG. 6A is a diagram of an example communications system 100 in which one or more disclosed embodiments may be implemented. For example, the Dash Client and/or the Legacy Dash Client may, but need not be a, WTRU 102. The DASH Client and/or the Legacy Dash Client could be a wired component instead of a WTRU. The integrity Verification Server, DASH Content Server may be one or more application servers that service a wired or wireless network and may be part of or external to a wired or wireless network.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 6A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a WTRU, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, e.g., one for each sector of the cell. The base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114*a* and the WTRUs 102*a*, 102*b*, 102*c* may implement a radio technology such as Evolved UMTS Terrestrial Radio Access (E-UTRA), which may establish the air interface 115/116/117 using Long Term Evolution (LTE) and/or LTE-Advanced (LTE-A).

The base station 114*a* and the WTRUs 102*a*, 102*b*, 102*c* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 6A may be a wireless router, Home Node B, Home eNode B, or access point, for example, and may utilize any suitable RAT for facilitating wireless connectivity in a localized area, such as a place of business, a home, a vehicle, a campus, and the like. The base station 114*b* and the WTRUs 102*c*, 102*d* may implement a radio technology such as IEEE 802.11 to establish a wireless local area network (WLAN). The base station 114*b* and the WTRUs 102*c*, 102*d* may implement a radio technology such as IEEE 802.15 to establish a wireless personal area network (WPAN). The base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 6A, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication. Although not shown in FIG. 6A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, 102*d* in the communications system 100 may include multi-mode capabilities, e.g. the WTRUs 102*a*, 102*b*, 102*c*, 102*d* may include multiple transceivers for communicating with different wireless networks over different wireless links. For example, the WTRU 102*c* shown in FIG. 6A may be configured to communicate with the base station 114*a*, which may employ a cellular-based radio technology, and with the base station 114*b*, which may employ an IEEE 802 radio technology.

Figure 6B:
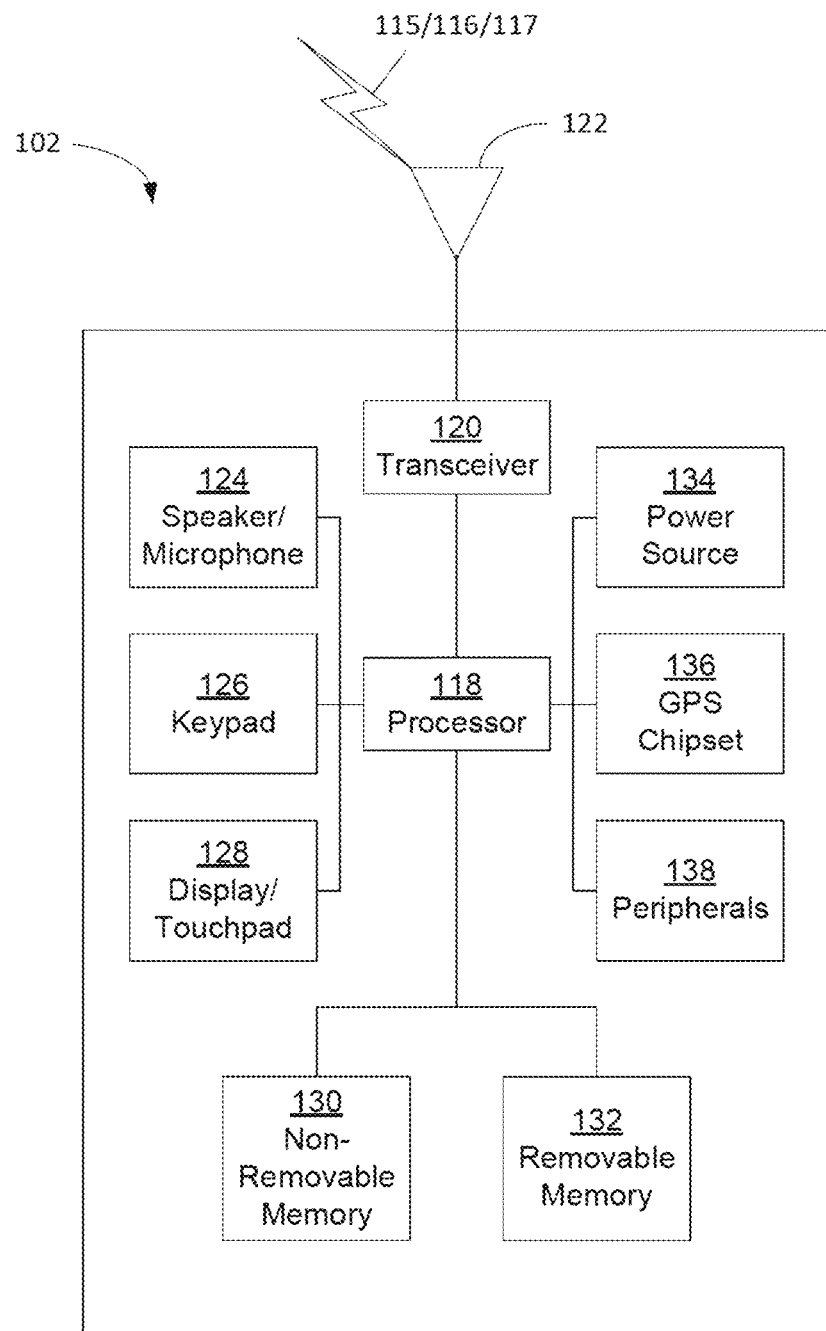
FIG. 6B is a system diagram of an example wireless transmit/receive unit (WTRU) that may be used within the communications system illustrated in FIG. 6A.

FIG. 6B is a system diagram of an example WTRU 102. As shown in FIG. 6B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 6B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 6B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 6B as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 6C:
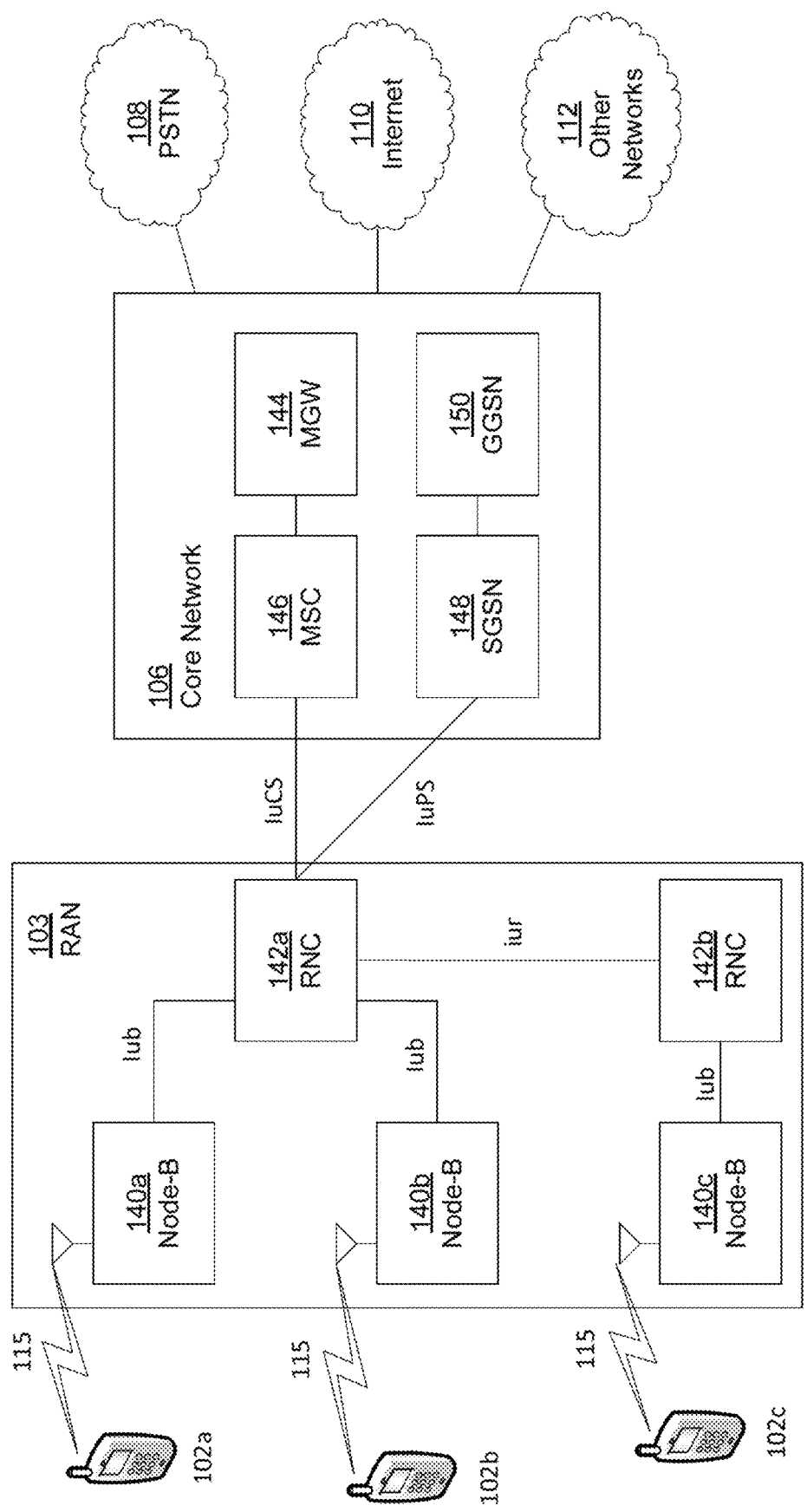
FIG. 6C is a system diagram of an example radio access network and an example core network that may be used within the communications system illustrated in FIG. 6A.

FIG. 6C is a system diagram of a RAN 103 and a core network 106. As noted above, the RAN 103 may employ a UTRA radio technology to communicate with the WTRUs 102a, 102b, 102c over the air interface 115. The RAN 103 may also be in communication with the core network 106. As shown in FIG. 6C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 6C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 6C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 6D:
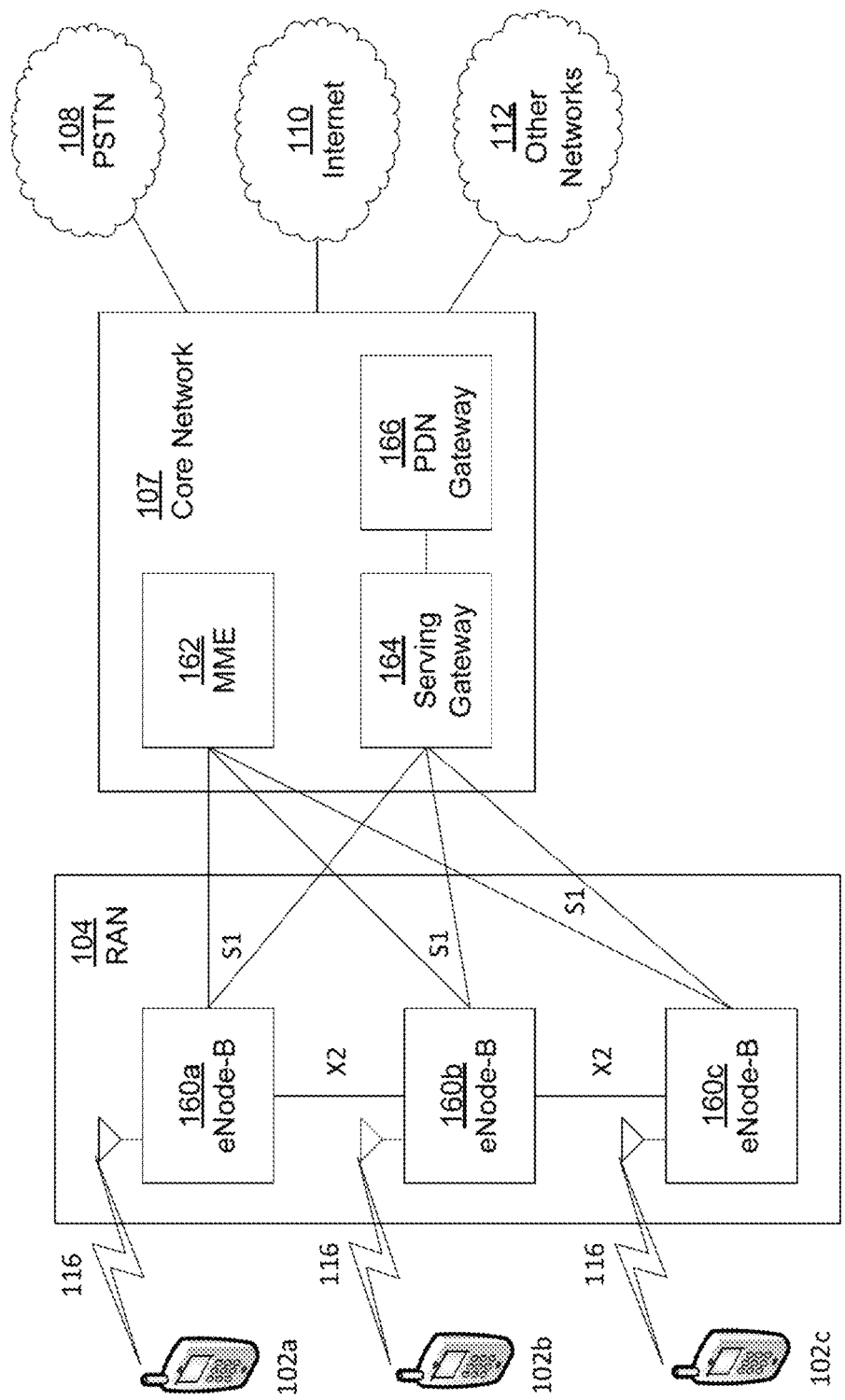
FIG. 6D is a system diagram of another example radio access network and an example core network that may be used within the communications system illustrated in FIG. 6A.

FIG. 6D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 6D, the eNode-Bs 160a, 160b, 160c may communicate with one another over an X2 interface.

The core network 107 shown in FIG. 6D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 6E:
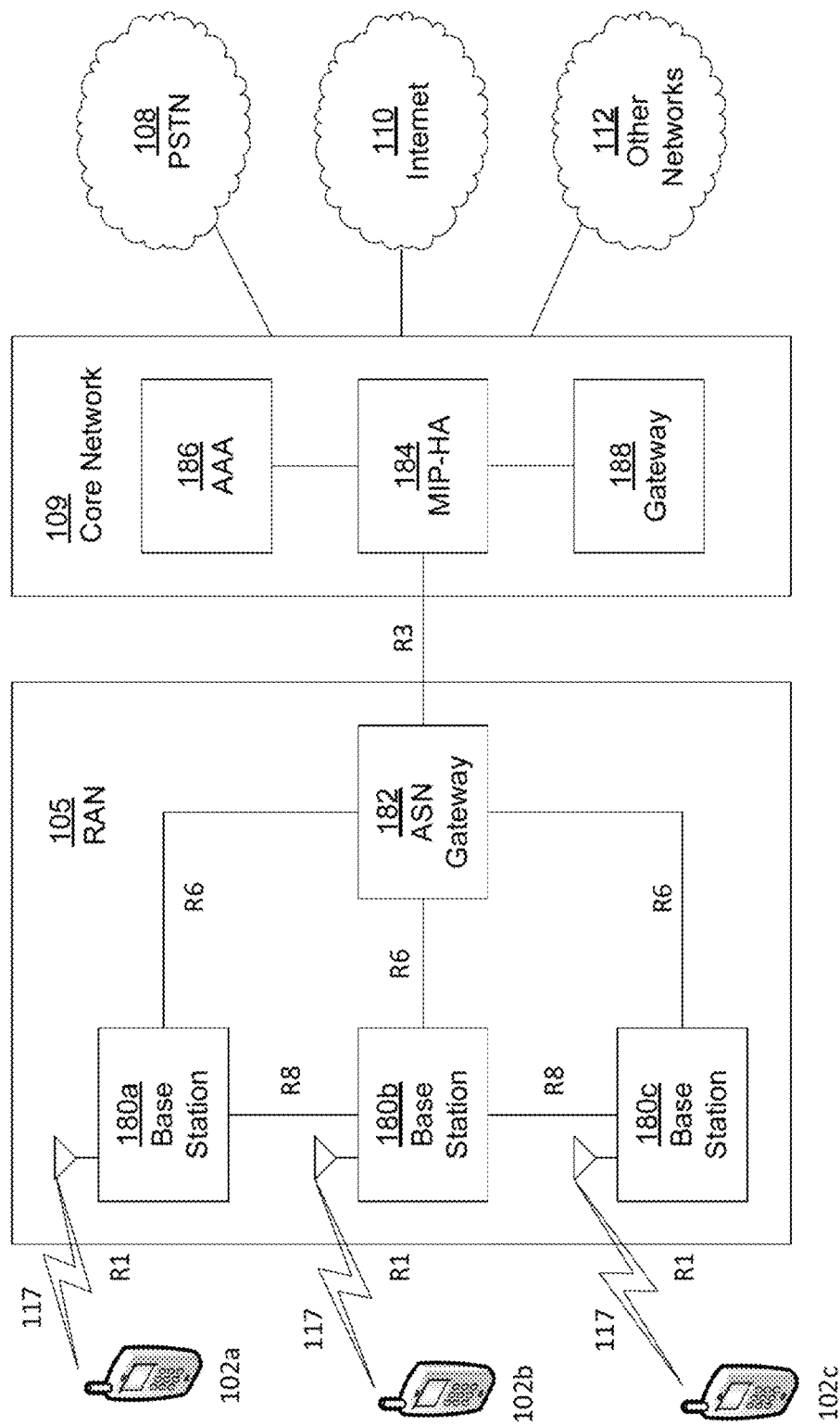
FIG. 6E is a system diagram of another example radio access network and an example core network that may be used within the communications system illustrated in FIG. 6A.

FIG. 6E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 6E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 6E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 6E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for streaming video content, comprising:
   a device receiving a media presentation description (MPD) file, the MPD file comprising a content authenticity XML element;
   the device sending a hypertext transfer protocol (HTTP) request for a media segment based on the MPD file;
   the device receiving the media segment from a content server;
   the device deriving an algorithm from the content authenticity XML element comprised in the MPD file;
   the device computing an authentication hash for the media segment using the algorithm derived from the content authenticity XML element;
   the device sending an HTTP request message that comprises a request for a server-provided hash associated with the media segment, the request for the server-provided hash comprising the computed authentication hash;
   the device receiving the server-provided hash; and
   the device determining authenticity of the media segment by comparing the computed authentication hash and the server-provided hash.

2. The method of claim 1, further comprising sending at least one diagnostic parameter in the HTTP request message.

3. The method of claim 2, wherein the at least one diagnostic parameter comprises at least one of an Internet Protocol (IP) address of the content server that provided the media segment, device location information, a cell tower identification, a wireless access point identifier, or signal strength.

4. The method of claim 1, further comprising encrypting the HTTP request message.

5. The method of claim 1, wherein the algorithm is a digest algorithm.

6. The method of claim 1, further comprising embedding the computed authentication hash into a uniform resource locator (URL) parameter.

7. The method of claim 1, further comprising determining an HTTP header,
   wherein sending the HTTP request message further comprises using the HTTP header to send the computed authentication hash in the HTTP request message.

8. The method of claim 1, further comprising receiving an HTTP response message comprising an indication of whether the server-provided hash is available or an error message.

9. The method of claim 1, wherein sending the HTTP request message comprises sending the HTTP request message to the content server or an integrity verification server.

10. A device for adaptively streaming video content, comprising:
    a processor programmed with executable instructions to:
      receive a media presentation description (MPD) file, the MPD file comprising a content authenticity XML element;
      send a hypertext transfer protocol (HTTP) request for a media segment based on the MPD file;
      receive the media segment from a content server;
      derive an algorithm from the content authenticity XML element comprised in the MPD file;
      compute an authentication hash for the media segment using the algorithm derived from the content authenticity XML element;
      send an HTTP request message that comprises a request for a server-provided hash associated with the media segment, the request for the server-provided hash comprising the computed authentication hash;
      receive the server-provided hash; and
      determine authenticity of the media segment by comparing the computed authentication hash and the server-provided hash.

11. The device of claim 10, wherein the processor is further programmed with executable instructions to send at least one diagnostic parameter in the HTTP request message.

12. The device of claim 11, wherein the at least one diagnostic parameter comprises at least one of an internet protocol (IP) address of the content server that provided the media segment, device location information, a cell tower identification, a wireless access point identifier, or signal strength.

13. The device of claim 10, wherein the processor is further programmed with executable instructions to encrypt the HTTP request message.

14. The device of claim 10, wherein the algorithm is a digest algorithm.

15. The device of claim 10, wherein the processor is further programmed with executable instructions to embed the computed authentication hash into a uniform resource locator (URL) parameter.

16. The device of claim 10, wherein the processor is further programmed with executable instructions to generate an HTTP header,
   wherein the processor programmed with executable instructions to send the HTTP request message is further programmed with executable instructions to use the HTTP header to send the computed authentication hash in the HTTP request message.

17. The device of claim 10, wherein the processor is further programmed with executable instructions to receive an HTTP response message comprising an indication of whether the server-provided hash is available or an error message.

* * * * *